United States Patent
Patel et al.

(10) Patent No.: US 11,035,669 B2
(45) Date of Patent: Jun. 15, 2021

(54) TILT AND DISTANCE PROFILING VEHICLE

(71) Applicant: Saudi Arabian Oil Company, Dhahran (SA)

(72) Inventors: Sahejad Patel, Thuwal (SA); Fadl Abdellatif, Thuwal (SA); Brian Parrott, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 91 days.

(21) Appl. No.: 16/122,427

(22) Filed: Sep. 5, 2018

(65) Prior Publication Data

US 2019/0242743 A1    Aug. 8, 2019

Related U.S. Application Data

(60) Provisional application No. 62/626,934, filed on Feb. 6, 2018.

(51) Int. Cl.
*G01C 7/00* (2006.01)
*G01F 25/00* (2006.01)
(Continued)

(52) U.S. Cl.
CPC .............. *G01C 7/00* (2013.01); *B62D 57/024* (2013.01); *G01C 7/04* (2013.01); *G01F 25/0084* (2013.01);
(Continued)

(58) Field of Classification Search
CPC ...... G01N 29/265; G01C 7/04; G01C 11/025; G01B 11/245; G01B 11/30–306;
(Continued)

(56) References Cited

U.S. PATENT DOCUMENTS

| 5,809,099 A * | 9/1998 | Kim | ..................... G21C 17/013 |
| | | | 376/249 |
| 7,693,654 B1 * | 4/2010 | Dietsch | .................. G01C 21/20 |
| | | | 701/461 |

(Continued)

OTHER PUBLICATIONS

International Search Report dated May 23, 2019 in International Patent Application No. PCT/US2019/016819. 4 pages.
(Continued)

*Primary Examiner* — Nathaniel J Kolb
(74) *Attorney, Agent, or Firm* — Leason Ellis LLP (57) ABSTRACT

Disclosed herein are systems and methods for profiling a surface. In some embodiments, the systems and methods perform profiling using a robotic vehicle. The vehicle can include a drive system, one or more wheel encoders, and one or more distance sensors and/or inertial measurement units for capturing measurement data, such as the slope of the surface or the angle of the robotic vehicle relative to the surface or the gravity vector. A control computing system is included having one or more processors that execute instructions stored in software modules to process movement data. In some embodiments, the processed movement data determines a plurality of snapshots of the surface at different times and positions as the robotic vehicle traverses the surface. These snapshots are combined to generate a profile of the surface.

18 Claims, 7 Drawing Sheets

(51) Int. Cl.
  *B62D 57/024* (2006.01)
  *G05D 1/02* (2020.01)
  *G01C 7/04* (2006.01)
(52) U.S. Cl.
  CPC ........... G05D 1/027 (2013.01); G05D 1/0272 (2013.01); *G05B 2219/45066* (2013.01); *G05D 2201/0207* (2013.01)
(58) Field of Classification Search
  CPC ........... G01B 2219/45066; G01S 17/89; G01S 17/931; B62D 57/024
  See application file for complete search history.

(56) References Cited

U.S. PATENT DOCUMENTS

| | | | |
|---|---|---|---|
| 8,352,189 B2* | 1/2013 | Scott | G01C 21/165 |
| | | | 702/5 |
| 9,188,472 B2 | 11/2015 | Hassell, Jr. | |
| 2002/0176608 A1 | 11/2002 | Rose | |
| 2005/0252296 A1 | 11/2005 | Hock et al. | |
| 2007/0233327 A1 | 10/2007 | McCain | |
| 2010/0030378 A1 | 2/2010 | Choi et al. | |
| 2010/0198516 A1* | 8/2010 | Scott | G01C 21/165 |
| | | | 702/5 |
| 2014/0230711 A1* | 8/2014 | Lovelace | B08B 17/00 |
| | | | 114/222 |
| 2014/0324383 A1* | 10/2014 | Toom | G01C 7/04 |
| | | | 702/168 |
| 2014/0345375 A1 | 11/2014 | Hassell et al. | |
| 2015/0153170 A1* | 6/2015 | Gonzalez | G01B 21/22 |
| | | | 701/300 |
| 2019/0015971 A1* | 1/2019 | Carrasco Zanini | B60B 19/006 |
| 2019/0017656 A1* | 1/2019 | Carrasco Zanini | B60B 19/006 |

OTHER PUBLICATIONS

International Preliminary Report on Patent ability in Corresponding PCT Application No. PCT/US2019/016819 dated Feb. 7, 2020. 19 pages.
International Search Report and Written Opinion in Corresponding PCT Application No. PCT/US2019/016819 dated May 23, 2019. 30 pages.

* cited by examiner

TILT AND DISTANCE PROFILING VEHICLE

CROSS-REFERENCE TO RELATED APPLICATIONS

This application is based on and incorporates by reference, U.S. Provisional Patent Application Ser. No. 62/626,934, filed on Feb. 6, 2018, the entire contents of which is incorporated by reference as if set forth in its entirety herein.

FIELD OF THE INVENTION

The present invention generally relates to systems and methods for profiling of surfaces. In particular, the present invention relates to profiling and measurement of surfaces by vehicles in a non-destructive manner.

BACKGROUND OF THE INVENTION

In the oil and gas industry the storage tanks for crude and refined products play a key part in the supply chain of hydrocarbons. Knowing the exact volume of these storage units plays a critical role when transferring products to and/or from the tanks. As a result of variations in external and internal conditions (i.e. temperature) and aging and also as a result of the weight of the liquid product (i.e. hydrostatic pressure), the tank volume can vary by as much as +/−0.2%. Considering a 250,000 barrel storage tank, this variation would result in a volume of +/−500 barrels in volume change.

As a result of the high value of petroleum hydrocarbons, there is a mandatory requirement for calibration of storage tanks. Tanks used for custody transfer must be calibrated such that the transferred volume is very accurately known (e.g., Less than 0.1% error). The most commonly used techniques to perform this are; manual strapping (API MPMS 2.2A), optical techniques (Optical Reference Line Method ORLM—API Chapter 2.2B, Optical Triangulation Method (OTM)—API Chapter 2.2C, Electro-Optical Distance Ranging Method (EODR)—API Chapter 2.2D) and liquid calibrations (API Standard 2555). However, these measurements have been found to produce errors and have other deficiencies. In some cases, the foregoing testing techniques require tank downtime (e.g., emptying of the tank or otherwise halting the tank operation temporarily), which accumulates additional costs to the losses incurred. Moreover, many of the foregoing testing techniques are invasive in that they require accessing the internal volume of the tank and also can be destructive.

The existing methods for tank calibration present significant drawbacks. For instance, using the current standards, it can take 1-2 days of work to perform the calibration. As a result, calibration of storage tanks is performed infrequently thus leading to inaccurate measurements of the actual volume stored within the tank or transferred to and from the tank, which can be costly. For example, a traditional timeframe between calibrations can be between five and fifteen years.

What is needed are systems and methods for profiling and inspecting surfaces for inspection, calibration, and construction tasks. Additionally, what is needed are systems and methods for calibrating the volume of storage tanks that addresses the limitations associated with the efficiency of performing calibration using existing systems. More specifically, what is needed are systems and methods for accurately performing tank calibration that can be deployed and operated in a relatively quick, low-cost, and non-invasive manner. What is also needed is a system that can be deployed quickly and on-demand and thus facilitates detection of changes in tank volume on a more frequent basis (e.g., on a daily basis or even per-fill basis).

It is with respect to these and other considerations that the disclosure made herein is presented.

SUMMARY OF THE INVENTION

According to a broad aspect of the invention, systems and methods for generating a profile of a surface are provided. In one or more embodiments, such profiling is achieved using a robotic vehicle.

In accordance with one aspect of the invention, a system for profiling a surface according to one or more embodiments is provided. In one or more embodiments, the system includes a robotic vehicle having a drive system, at least one wheel, and one or more wheel encoders housed within each wheel for measuring movement of the robotic vehicle when driven by the drive system. Further, one or more distance sensors are coupled to the robotic vehicle to measure a slope of the surface. For example, a first sensor can be mounted on a front portion of the robotic vehicle and a second sensor can be mounted on a rear portion of the robotic vehicle. In one or more embodiments, the one or more distance sensors are arranged linearly lengthwise along a longitudinal axis of the robotic vehicle, or are arranged linearly along a horizontal axis of the vehicle axis of the robotic vehicle. The one or more sensors can also be arranged substantially equidistant from one another. In one or more embodiments, the sensors are arranged on an outer surface of the robotic vehicle. In one or more embodiments, the sensors are arranged within the robotic vehicle. The system for profiling a surface can also include one or more inertial measurement units. For example, the inertial measurement units can be an accelerometer or gyroscope. The one or more inertial measurement units can be housed within the vehicle or can be attached to an outer surface of the vehicle.

Continuing with this aspect of the invention, the system additionally includes a control computing system. The control computing system includes a non-transitory computer readable storage medium, one or more processors in electronic communication with the one or more sensors, each wheel encoder, the robotic vehicle and the computer readable storage medium, and one or more software modules comprising executable instructions stored in the storage medium.

The one or more software modules are executable by the processor and include: a movement module that configures the processor to receive movement data from the one or more wheel encoders to determine the position of the robotic vehicle, and a sensor control module that configures the processor to instruct the one or more distance sensors to transmit one or more signals toward the surface at respective impulse times, and to detect a time for the one or more signals to reflect off of the surface, and to receive movement data from the movement module, in which the sensor control module determines a snapshot of the surface by calculating a slope of the surface using the time for the one or more signals to reflect and the movement data. In one or more embodiments, the movement data includes a speed of the robotic vehicle or a distance traveled of the robotic vehicle. In one or more embodiments, the control computing system further includes a profile analysis module that configures the processor to calculate a respective time of flight (TOF) for the one or more signals traveling between the sensor and the surface, to determine a respective slope of the surface at a given point based on the respective TOF and the movement data, and to store the respective slope of the surface at the given point in the non-transitory computer readable storage medium. The robotic vehicle is then driven by the drive system to traverse the surface while the control computing system continuously determines a plurality of snapshots of the surface as the position of the robotic vehicle changes to generate a profile of the surface.

In another aspect of the invention, a system for profiling a surface according to one or more embodiments is provided. In one or more embodiments, the system includes a robotic vehicle having a drive system, at least one wheel, and one or more wheel encoders housed within each wheel for measuring movement of the robotic vehicle when driven by the drive system. The system further includes an inertial measurement unit coupled to the robotic vehicle for measuring an angle of the robotic vehicle relative to the direction of gravity. In one or more embodiments, the system includes one or more distance sensors mounted to or within the robotic vehicle to measure a slope of the surface.

Continuing with this aspect of the invention, the system additionally includes a control computing system. The control computing system includes a non-transitory computer readable storage medium, one or more processors in electronic communication with the one or more sensors, each wheel encoder, the robotic vehicle and the computer readable storage medium, and one or more software modules comprising executable instructions stored in the storage medium, in which the one or more software modules are executable by the processor.

Continuing with this aspect of the invention, the one or more software modules include a movement module, a sensor control module, and a profile analysis module. The movement module configures the processor to receive movement data from the one or more wheel encoders to determine the changing position of the robotic vehicle. The senor control module configures the processor to instruct the inertial measurement unit to determine a first angle at a first position on the surface relative to gravity, and to determine a second angle at a second position on the surface relative to gravity. In one or more embodiments, the sensor control module configures the processor to instruct the one or more distance sensors to transmit one or more signals toward the surface at respective impulse times, in which the sensor control module further configures the processor to, using the one or more distance sensors, detect a reflection of the one or more signals off of the surface. The profile analysis module configures the processor to determine an offset in angle between the first angle and the second angle and calculate a change in slope between the first position and the second position, to receive the movement data from the movement module, and to determine a snapshot of the surface between the first position and the second position using the calculated change in slope and movement data and to store the snapshot in the non-transitory computer readable storage medium. In one or more embodiments, the profile analysis module determines an offset by calculating a sine of an average of the first angle and the second angle multiplied by a distance measured by the one or more wheel encoders between the first position and the second position. The robotic vehicle is then driven by the drive system to traverse the surface while the control computing system continuously determines a plurality of snapshots of the surface as the position of the robotic vehicle changes to generate a profile of the surface.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Throughout the specification, terms may have nuanced meanings suggested or implied in context beyond an explicitly stated meaning. Likewise, the phrase "in one implementation" as used herein does not necessarily refer to the same implementation and the phrase "in another implementation" as used herein does not necessarily refer to a different implementation. Similarly, the phrase "one or more implementations" as used herein does not necessarily refer to the same implementation and the phrase "at least one implementation" as used herein does not necessarily refer to a different implementation. The intention is, for example, that claimed subject matter includes combinations of example implementations in whole or in part.

The present disclosure details systems and methods for generating a profile of a surface. As present approaches in the technical field of surface profiling have not been highly effective or efficient in doing surface profiling using robotic inspection devices without a remote base station to process gathered data, the present systems and methods employ hardware, software, and/or a combination of the two to provide surface profiling systems that do not require remote processing or base stations. In particular, the present disclosure details an improved robotic system in which one or more sensors are arranged on a robot and configured to gather robot orientation data relative to the surface as the robot moves along the surface in order to generate "snapshots" of the surface, in other words, to capture and optionally further generate data concerning the orientation of the robot at given locations on the surface. Advantageously, the "snapshots" disclosed herein can be captured and or generated using devices having sensors that have a wider spectrum of responsiveness than an optical capture device such as a camera. Robot orientation data includes a measurement of the tilt of the vehicle relative to the direction of gravity as the vehicle traverses along the surface. The system then merges these snapshots, under control of a programmed processor, to provide a profile of the surface. The systems and methods herein are described are useful in profiling any type of surface, but have particular application in the fields of surface inspection, storage tank calibration, construction, and shipbuilding, for example.

In one aspect, the systems disclosed herein include an accelerometer or other inertial measurement unit integrated into a robotic vehicle, the robotic vehicle also including one or more distance sensors used to rapidly profile a surface in the absence of external references. The systems herein measure surface curvature and calculate absolute offsets of vehicle position relative to the surface, using a processor executing code that configures the processor for that purpose. The measured offset can be used to calculate the magnitude of the deformations of the surface, and thus profile the surface. While external references can be added to the system to enhance accuracy, the vehicle can generate the surface profile using only onboard sensors and the pull of gravity. In one or more embodiments, the robotic vehicle includes wheel encoders that determine the movement of the vehicle across the surface, again, using a processor executing code that configures the processor for that purpose.

Figure 1:
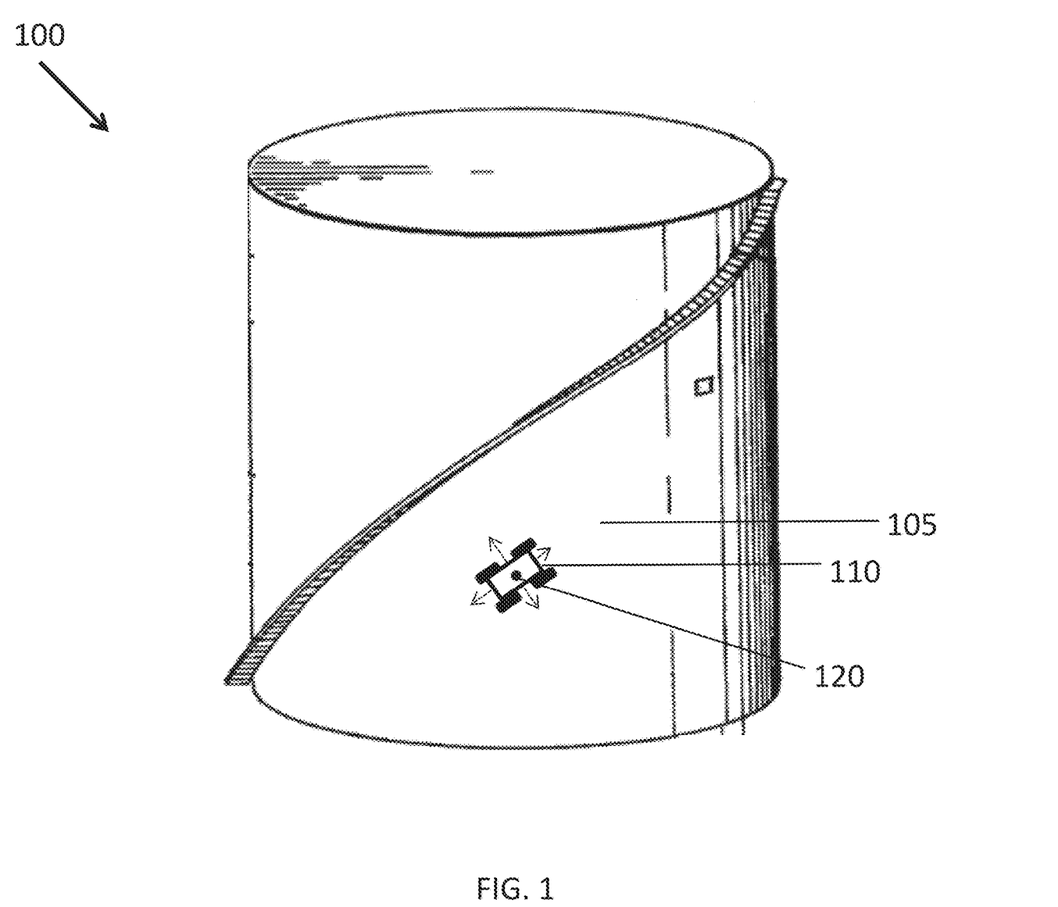
FIG. 1 presents a high-level diagram illustrating an exemplary configuration of a system for profiling a surface of an exemplary storage container according to one or more embodiments.

Accordingly, in some configurations, the system 100 can include one or more robotic vehicles or "robots" that are configured to autonomously and semi-autonomously traverse the surface being profiled. For instance, as shown in FIG. 1, a robot 110 is deployed on a cylindrical container 105. As would be understood by those in the art of robotics, a robot 110 is a mobile robotic device that includes a body and a drive system for moving the robot during operation. The drive system includes at least one wheel and at least one motor for powering the at least one wheel. The wheels can be drive wheels, omni-wheels, or other type of robotic wheels known in the art. The robot can be powered by, for example, solar cells, batteries, or any other suitable power source. The robot can include functional hardware components specifically designed to facilitate performing operational tasks, for instance, sensors for detecting height, position, orientation of the robot, and the like. Operation tasks can include, in addition to profiling a surface, for example, performing surface inspections (e.g., wall thickness measurements, surface geometry) or coating porosity measurements. The robot hardware can also include on-board sensors and accelerometers/inertial measurement units used in the surface profiling processes and, in addition or alternatively, components suitable for transporting and deploying other devices configured to operate in a stand-alone fashion. In one or more embodiments, the robot 110 includes one or more distance sensor(s) 120. For example, the distance sensor can be an optical sensor, an ultrasonic sensor, LIDAR, or other sensor capable of determining distance. The robot 110 can include electronic circuitry within the body that includes a memory and/or computer readable storage medium which are configured to store information relating to the operation of the robot such as configuration settings and one or more control programs and processors that facilitate the performance of the container volume calibration operations, as noted previously. The system 100 also includes one or more software modules comprising executable instructions that are stored in the storage medium and are executable by the processor.

Figure 2:
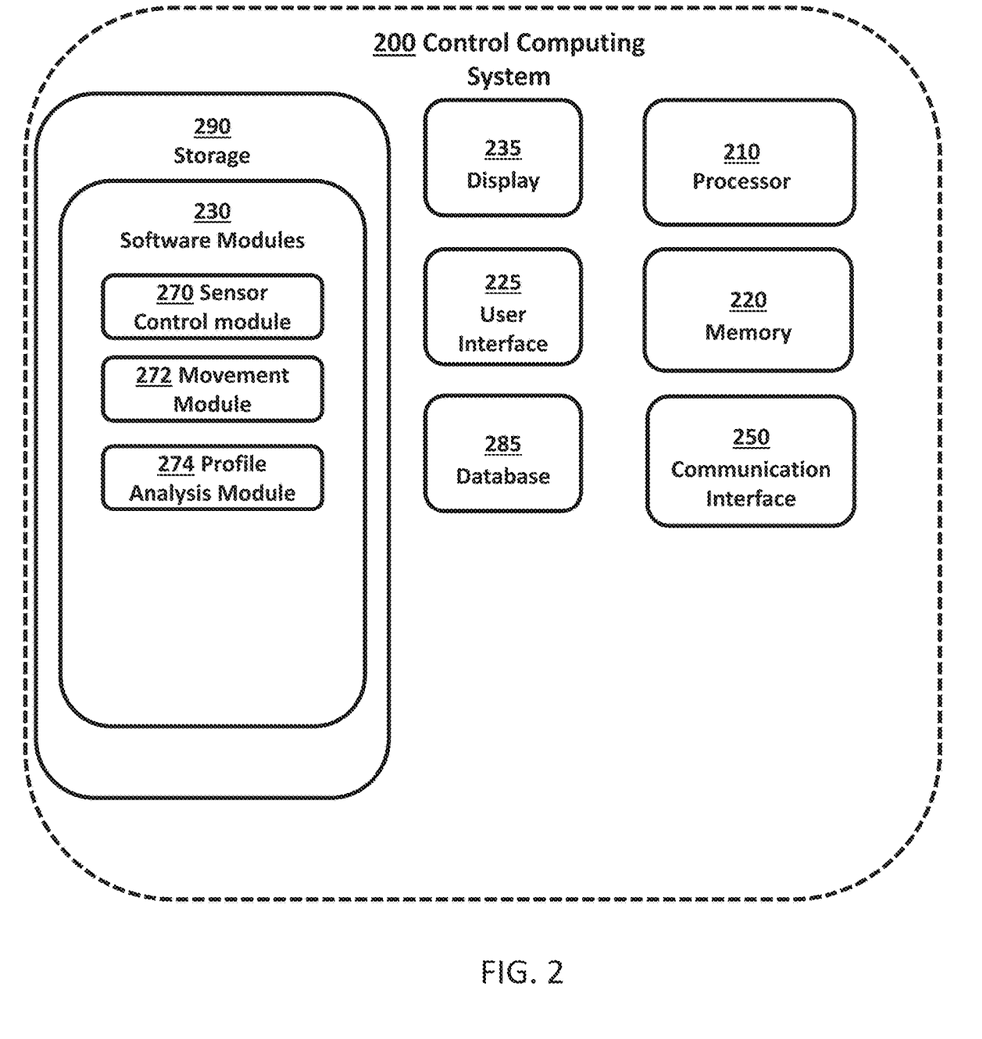
FIG. 2 presents a block diagram illustrating an exemplary configuration of a control computing system according to one or more embodiments.

With reference now to FIG. 2, a control computing system 200 according to one or more embodiments is described. As shown, the control computer system 200 can be arranged with various hardware and software components that serve to enable operation of the system 100, including a processor 210, a memory 220, a communication interface 250 and a computer readable storage medium 290. In one or more embodiments, the processor 210, memory 220, and communication interface 250 are integrated on a single circuit board.

The processor 210 serves to execute software instructions that can be stored in the storage 290 and loaded into the memory 220. The processor 210 can be a number of processors, a multi-processor core, or some other type of processor, depending on the particular implementation. In one or more embodiments, the processors 210 are in electronic communication with one or more distance sensors (e.g., distance sensors 120), wheel encoders and other components of the robotic vehicle 110.

Preferably, the memory 220 and/or the storage 290 are accessible by the processor 210, thereby enabling the processor 210 to receive and execute instructions stored on the memory 220 and/or on the storage 290. The memory 220 can be, for example, a random-access memory (RAM) or any other suitable volatile or non-volatile computer readable storage medium. In addition, the memory 220 can be fixed or removable. The storage 290 can take various forms, depending on the implementation. For example, the storage 290 can contain one or more components or devices such as a hard drive, a flash memory, a rewritable optical disk, a rewritable magnetic tape, or some combination of the above. The storage 290 also can be fixed or removable, local storage or remote storage such as cloud-based data storage systems.

In one or more embodiments, the control computing system 200 also includes a display 235 and a user interface 225. The display can be displayed on a touchscreen or other display operatively coupled to an input device (not shown). For example, the display can be located at a robot (e.g., robot 110) and used to output surface profiling results that a user can interact with via the user interface 225.

One or more software modules 230 are encoded in the storage 290 and/or in the memory 220. The software modules 230 can comprise one or more software programs or applications having computer program code, a script, or a set of interpretable instructions executed in the processor 210. Such computer program code or instructions for carrying out operations and implementing aspects of the systems and methods disclosed herein can be written in any combination of one or more programming languages or scripts. The program code can execute entirely on the control computing system 200, as a stand-alone software package, partly on the control computer and partly on a remote computer/device (e.g., sensors, transducers and/or robots) or entirely on such remote computers/devices. In the latter scenario, the remote computer systems can be connected to control computing system 200 through any type of electronic data connection or network, including a local area network (LAN) or a wide area network (WAN), or the connection can be made through an external computer (for example, through the Internet using an Internet Service Provider). In those scenarios, the control computing system 200 can include a network card or other means for wirelessly transmitting data, as is known in the art.

In one or more embodiments, included among the software modules 230 are a sensor control module 270, a movement module 272, and a profile analysis module 274 that are executed by processor 210. During execution of the software modules 230, the processor 210 is configured to perform various operations relating to the profiling of surfaces, as will be described in greater detail below.

In one or more embodiments, the sensor control module 270 configures the processor 210 to instruct one or more distance sensors (e.g., distance sensors 120) to transmit one or more signals toward the surface being traversed at respective impulse times. The sensor control module 270 further configures the processor to, using the one or more distance sensors, detect the arrival of the transmitted signals as they are reflected back from the traversing surface. In this way, the time the signal takes to reflect is measured and in turn, the distance from the vehicle to the surface. As the robotic vehicle travels along the surface, the distance measurements change, and the topology of the surface can be determined accordingly. For example, using the known distance formulas distance=velocity*time, and assuming that the signals travel at the speed of light, the distance can be easily calculated by the sensor control module 270 by measuring the time it takes for the signal to reflect.

In one or more embodiments, each distance sensor is instructed to transmit a signal simultaneously. In other embodiments, each distance sensor is instructed to transmit a signal in alternating intervals. For example, the sensor control module 270 can cause the distance sensors to transmit signals based on the current vehicle speed and direction so that, as each sensor is estimated to be passing over a particular location, the respective sensor data can be compared to refine the accuracy of the surface measurements.

In one or more embodiments, the sensor control module 270 configures the processor to instruct an inertial measurement unit to determine a first angle at a first position relative to the gravity vector, and to determine a second angle at a second position relative to the gravity vector once the vehicle has moved from the first position to the second position. In this way, the relative tilt of the vehicle from rest as caused by the surface can be obtained, and in turn, additional information about the surface's topology can be obtained.

The movement module 272 configures the processor to receive movement data from one or more wheel encoders to determine the position of the robotic vehicle. Wheel encoders provide the ability to measure the amount that each wheel of the vehicle turns, and thereby provide an indicator of vehicle distance traveled. The movement module receives information from the memory concerning the size of the wheel and, in conjunction with the determinations of the amount that each wheel of the vehicle has turned, can calculate the distance traveled by the vehicle.

In one or more embodiments, the profile analysis module 274 configures the processor to calculate a respective time of flight (TOF) for the one or more signals traveling between a respective distance sensor and the surface. This may be in conjunction with operation of the sensor control module 270. The profile analysis module 274 then determines a respective slope of the surface at a given point based on the respective TOF and the movement data provided by the movement module 272. From this, the topology of the surface can be stitched together. The profile analysis module can also store the respective slope of the surface at the given point in the non-transitory computer readable storage medium (e.g., in a memory).

In one or more embodiments, the profile analysis module 274, in conjunction with the sensor control module 270 and/or the inertial measurement unit, configures the processor to determine an offset in angle between a first angle and a second angle, in which the first angle and the second angle are measured as the vehicle's respective position relative to the gravity vector at two different vehicle position. The profile analysis module 274 can store the respective angles measured relative to the surface at each given point in the non-transitory computer readable storage medium (e.g., in a non-volatile memory device). In one or more embodiments, the offset is determined relative to a longitudinal axis of the robotic vehicle.

The offset in angle between the first angle and the second angle can be used to determine a profile of the surface. As the respective angles indicate a measure of tilt of the robotic vehicle relative to the surface, the profile analysis module 274 can use this information to determine a profile of the surface. For example, if an inertial measurement unit is placed central to the robotic vehicle, and a wheel positioned at the front of the vehicle begins moving up an incline, the inertial measurement unit will measure that incline angle relative to the remainder of the vehicle. Thereafter, the profile analysis module 274 can take that angle data, in conjunction with wheel encoder movement data, and determine that the surface has a slope of the measured angle for a distance provided by the movement data.

It can also be said that the program code of the software modules 230 and one or more of the non-transitory computer readable storage devices (such as the memory 220 and/or the storage 290) form a computer program product that can be manufactured and/or distributed in accordance with the present disclosure, as is known to those of ordinary skill in the art.

It should be understood that in some illustrative embodiments, one or more of the software modules 230 can be downloaded over a network to the storage 290 from another device or system via communication interface 250 for use within the system for configuring field robots 110.

In addition, it should be noted that other information and/or data relevant to the operation of the present systems and methods can also be stored on the storage 290, for instance various control programs used in the operation of the system 100 (e.g., sensors, encoders, transducers) and/or the robots during use.

A database 285 can also be stored on the storage 290. Database 285 can contain and/or maintain various data items and elements that are utilized throughout the various operations of the system 100. The information stored in database 285 can include, but is not limited to, software and information for coordinating the operation of the sensors, software and information for coordinating the movement of robots while deploying sensors into their respective positions during surface profiling, known characteristics used to perform the profiling measurements and calculate surface dimensions (e.g., surface slope, geometry and dimensions of the surface). It should be noted that although database 285 is depicted as being configured locally to the storage of the control computing system 200, in certain implementations, database 285 and/or various of the data elements stored therein can be located remotely and connected to the control computing system 200 through a network in a manner known to those of ordinary skill in the art.

While it is an advantage of one or more embodiments herein that the control computing system 200 is capable of performing surface profiling without the need for remote input or processing, in other embodiments, a communication interface 250 is also operatively connected to the processor 210. The communication interface 250 can be any interface that enables communication between the control computing system 200 and external devices, machines and/or elements such as the transducer, sensors and any robots used in connection with the profiling operations. Preferably, the communication interface 250 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the control computing system 200 to other computing devices and/or communication networks, such as private networks and the Internet. Such connections can include a wired connection or a wireless connection (e.g., using the IEEE 802.11 standard) though it should be understood that communication interface 250 can be practically any interface that enables communication to/from the control computer.

Figure 3:
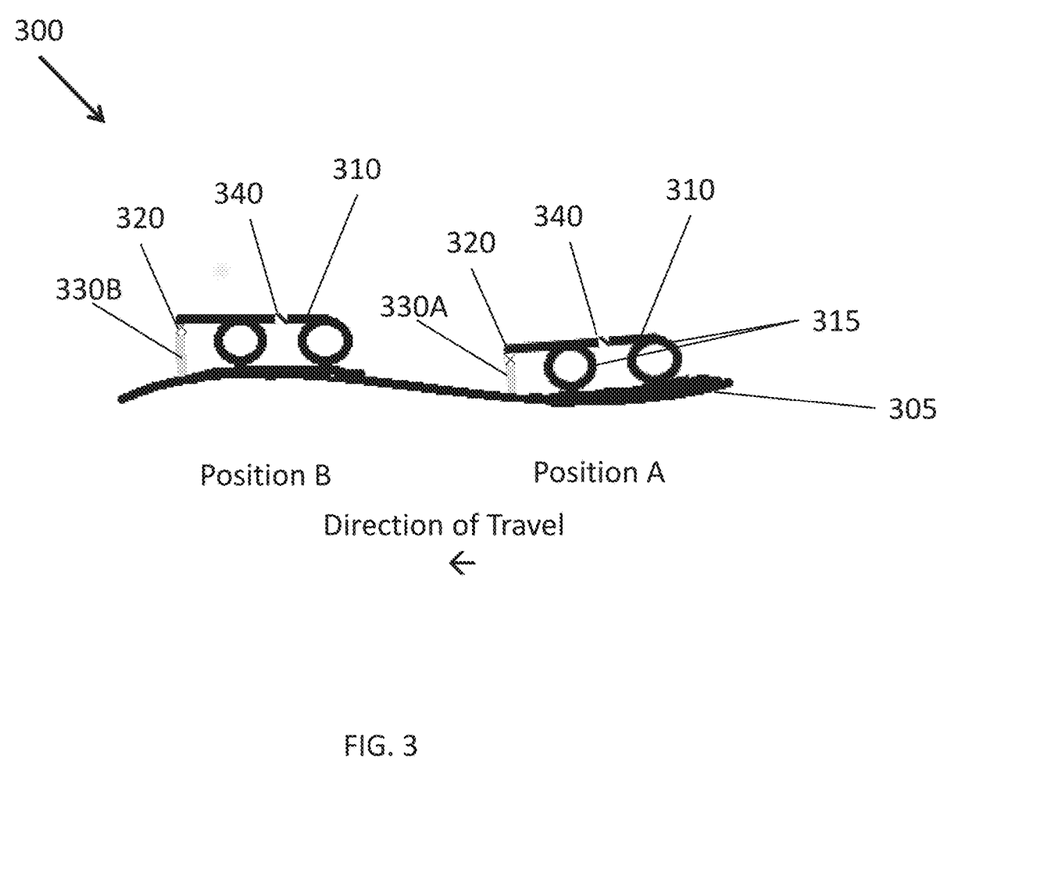
FIG. 3 presents a side view of an exemplary robotic vehicle, schematically illustrated, for profiling a system according to one embodiment.

With reference now to FIG. 3, a system 300 for profiling a surface 305 according to one or more embodiments is provided. The system 300 includes a robotic vehicle 310 having a set of wheels 315, a distance sensor 320, and a control computing system 340. The robotic vehicle 310 includes a drive system (not shown), such as an on-board motor for powering the vehicle and for movement. The set of wheels 315 can include one or more wheel encoders (not shown) that gather movement information about the vehicle 310 such as vehicle speed and direction in order to inform the processor 210 of vehicle movement in order for the control computing system 200 to define the vehicle's movement along the surface 305. In one or more embodiments, the set of wheels 315 include one or more omni-wheels, drive wheels, treads or the like. In one or more embodiments, the set of wheels 315 include magnets to improve adherence to ferromagnetic surfaces. The robot can include other attachment mechanisms such as clamps, hooks, springs, cords, suction cups or other attachment mechanisms as are known in the art.

In one or more embodiments, the distance sensor 320 is a single optical, ultrasonic, or LIDAR sensor. In other embodiments, the distance sensor 320 encompasses a plurality of optical or ultrasonic sensors. The distance sensor 320 can be mounted on the front, back, and/or other defined position of the vehicle 310 depending on desired construction, so long as the distance sensor can transmit signals toward the surface 305 and receive the subsequent return signal. In a particular embodiment, a first distance sensor is mounted on the front of the robotic vehicle, and a second distance sensor is mounted on the rear of the robotic vehicle.

As shown in exemplary FIG. 3, the distance sensor 320 is mounted to the front of the robotic vehicle 310 and is arranged to transmit signals along a distance 330 to the surface 305. The distance 330 measured by the sensor determines how the slope of the surface changes relative to the current position and tilt of the vehicle on that surface, and from this a change in a slope of the surface is calculated. For example, in FIG. 3, the robotic vehicle 310 is first in a Position A along the surface 305 and measures a distance 330A. The drive system then activates the wheels 315 and moves the robotic vehicle 310 into Position B at a different location along the surface 305, where the vehicle makes a second measurement of distance 330B by the distance sensor 320. The respective "position" of the vehicle 310 should be understood as referring to the location (e.g., a point or area) on the surface where the distance sensor 320 transmits and/or receives signals. In one or more embodiments, the wheel encoders can also take location-measurements (e.g., by measuring wheel rotation) at each position.

It should be understood that the distance the robotic vehicle 310 travels between measurements (e.g., from Position A to Position B) should be very small, and many surface measurements should be taken in order to maximize the accuracy of the surface profiling. As more measurements are taken, and as the change in position of the robotic vehicle between each measurement is made smaller, the result is that the data output is higher in resolution (i.e., a finer integration of data that produces the surface profile).

System 300 further includes a control computing system 340 (e.g., control computing system 200). The control computing system 340 includes a processor, a memory, a non-transitory computer readable storage medium, and one or more software modules comprising executable instructions stored in the storage medium, in which the one or more software modules are executable by the processor.

Preferably, included among the software modules are a sensor control module, a movement module, and a profile analysis module. The sensor module configures the processor to instruct the one or more distance sensors to transmit one or more signals at respective impulse times, in which the sensor control module further configures the processor to, using the one or more distance sensors, detect the arrival of the one or more signals. The movement module configures the processor to receive movement data from the one or more wheel encoders to determine the position of the robot. The profile analysis module configures the processor to calculate a respective time of flight (TOF) for the one or more signals traveling between the sensor and the surface, to determine a respective slope of the surface at a given point based on the respective TOF and the movement data, and to store the respective slope of the surface at the given point in the non-transitory computer readable storage medium. As the robotic vehicle moves from position to position on the surface, the control computing system 340 executes the above modules to continuously determine the respective slopes along different positions of the surface. The changes in measured slope are then integrated and the position of the robot calculated using previous readings to generate a profile of the surface. The profile can be generated during robotic vehicle operation, or after operation has completed. Generating the profile can include "solving" the profile by finding a profile that would generate the readings that were observed. During execution of the software modules, the processor is configured to perform various operations relating to the profiling of surfaces, as will be described in greater detail below.

Figure 4:
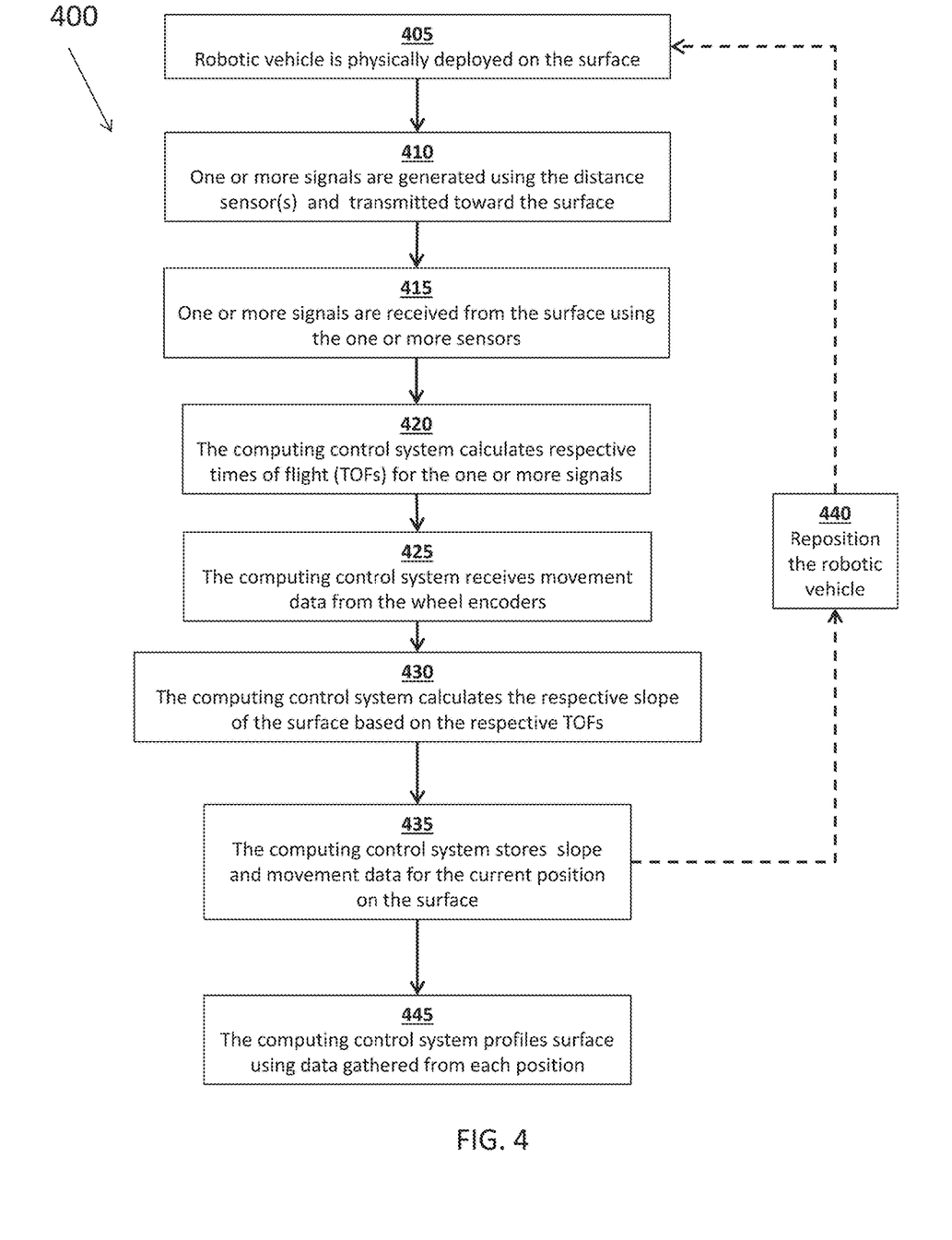
FIG. 4 is a flow diagram showing a routine that illustrates the systems and methods for profiling a surface according to one or more embodiments.

The operation of the exemplary surface profiling systems 100 and 300 illustrated in FIGS. 1 and 3 will be further appreciated with reference to FIG. 4. FIG. 4 is a high-level flow diagram of a routine 400 for generating a profile of a surface according to one or more embodiments of the invention.

The routine 400 begins at step 405, in which a robotic vehicle is deployed on a surface to be profiled. Thereafter, one or more signals are generated using one or more distance sensor(s), such as distance sensor 320, and transmitted toward the surface at the vehicle's present position. At step 415, the one or more signals are received from the surface back to the one or more sensors. This information is passed to a computing control system, such as computing control system 200, in which one or more software modules containing code are executed by a processor to perform profile calculations. In one or more embodiments, steps 415 and 420 are carried out by a sensor control module as described herein.

At step 420, the computing control system calculates respective times of flight (TOFs) for the one or more signals received at the distance sensor. Subsequently or simultaneously to this step, the computing control system receives movement data from wheel encoders, step 425. Movement data can include the present speed and direction of the robotic vehicle and is used to determine where the robotic vehicle is positioned on the surface. In one or more embodiments, a movement module configures the processor to receive movement data from the one or more wheel encoders to determine the position of the robot.

After receiving this information, the computing control system calculates the respective slope of the surface at the present location based on the respective TOFs, step 430. For example, a longer measured TOF at second position compared to a first position indicates that the surface at the second position is lower in elevation than the first position. At step 430, the calculated slope data and movement data for the current robotic vehicle position is stored in a storage medium. This information comprises a "snapshot" of the surface. If the surface has not yet been fully captured, i.e., there are insufficient snapshots to determine the profile of the entire surface, the robotic vehicle is repositioned to a new location, step 440, and the routine 400 branches back to step 405. This process can be repeated as many times as necessary to capture a desired surface within a prescribed threshold of accuracy.

Once the robotic vehicle has taken measurements along the entire surface to be profiled, the computing control system profiles surface using data gathered from each position, step 445. Profiling can include solving equations based on received TOF and movement data to determine how the surface looks. In one or more embodiments, steps 430, 435, and 445 can be implemented by the profile analysis module which comprises code executable in the processor 210 in order to perform those steps.

Figure 5:
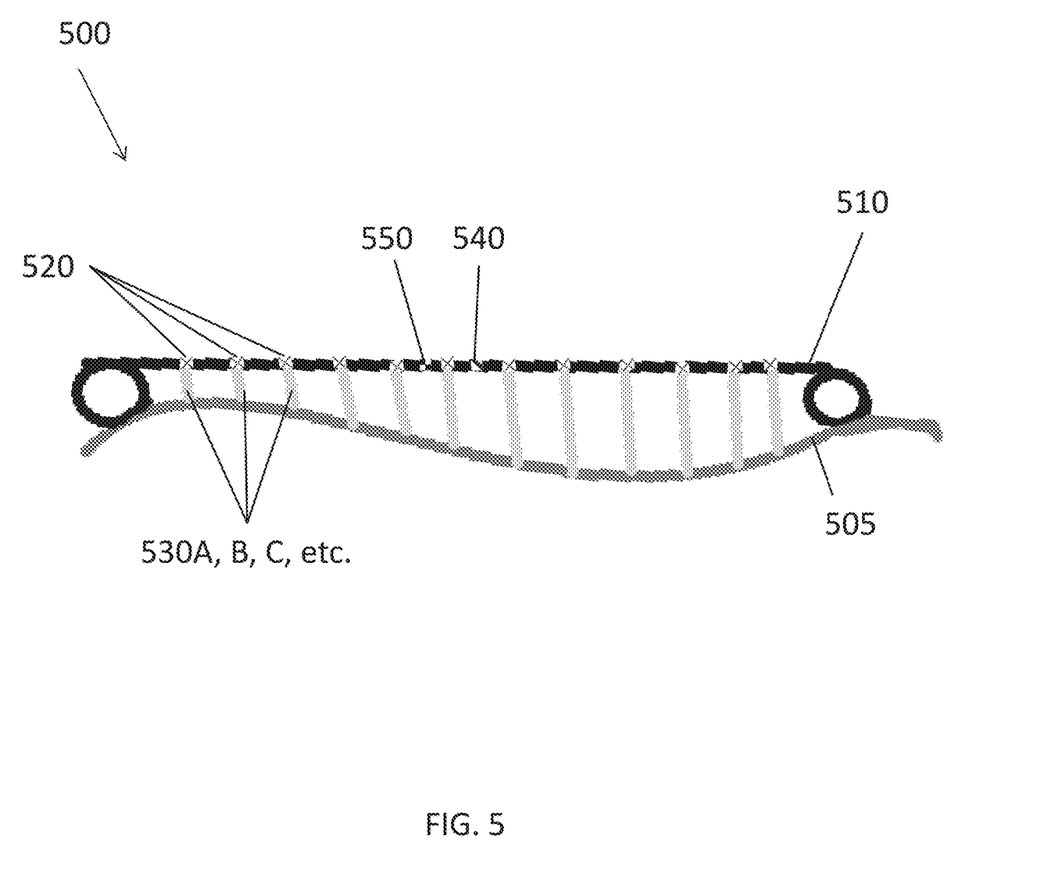
FIG. 5 presents a side view of an exemplary robotic vehicle, schematically illustrated, for profiling a system according to another embodiment.

With reference now to FIG. 5, a system 500 for profiling a surface 505 according to one or more embodiments is provided. The system 500 includes a robotic vehicle 510 having a plurality of distance sensors 520 aligned linearly along lengthwise along the longitudinal axis of the vehicle, each sensor being configured to measure a distance 530A, B, C, etc. to the surface 505 as described elsewhere herein. The longitudinal axis of the vehicle can be coaxial with a central frame of vehicle 510. In this way, each of the plurality of distance sensors 520 generates a separate data stream. Each distance sensor 520 can be calibrated to measure distances at different rates or different precisions, such as at regular time intervals. For example, one sensor can be configured to gather a distance measurement every 0.001 second, whereas another can be configured to gather a distance measurement every 0.01 second or 0.1 second. Similarly, each distance sensors can be separately configured to measure distance to the nearest centimeter, millimeter, or the like. The number of distance sensors 520 can be increased to provide finer "snapshot" measurements. In one or more embodiments, the distance sensors 520 are arranged substantially equidistant from one another. In one or more embodiments, the distance sensors 520 are arranged on an outer surface of the robotic vehicle 510. In one or more embodiments, the distance sensors 520 are arranged within the robotic vehicle 510.

To accommodate the plurality of distance sensors 520, robotic vehicle 510 is elongated relative to robotic vehicle 310. The robotic vehicle 510 also includes a control computing system 540 as described elsewhere herein (e.g., control computing system 200, 340). In certain embodiments, the rate of data gathering or precision can be optimized to manage the amount of data generated by the plurality of distance sensors 520 for passing to the control computing system 540.

The robotic vehicle 510 also houses an accelerometer 550 for capturing vehicle orientation data. While an accelerometer is contemplated herein, other inertial measurement units (e.g., gyroscopes) can be implemented. The accelerometer 550 is calibrated relative to the direction of gravity, meaning that the accelerometer measures the horizontal and/or vertical offset of the robotic vehicle 510 as it traverses the surface. This provides additional data beyond the distance measurements 530 themselves that can be used by the profile analysis module 274 to determine the profile of the surface 505. In this way, the control computing system 540 can adjust the captured "snapshots" of the surface to improve profiling accuracy. In one or more embodiments, the accelerometer 550 is located substantially central on the robotic vehicle 510 in the x- and y-planes.

In one or more embodiments, a plurality of accelerometers 550 are arranged on or within the robotic vehicle 510. In one or more embodiments, the accelerometers 550 are arranged substantially equidistant from one another.

Figure 6:
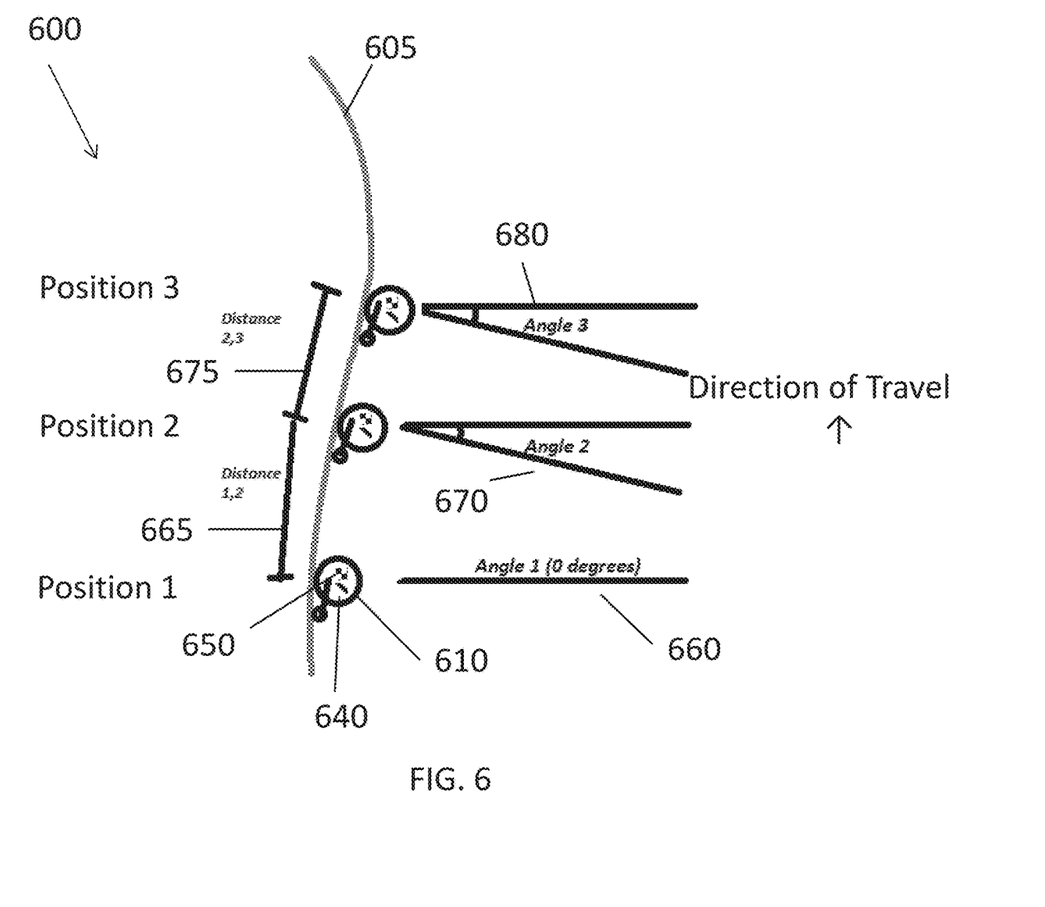
FIG. 6 presents a side view of an exemplary robotic vehicle, schematically illustrated, for profiling a system according to another embodiment.

With reference now to FIG. 6, a system 600 for profiling a surface 605 according to one or more embodiments is provided. The system 600 includes a robotic vehicle 610 having a set of wheels housing wheel encoders and a control computing system 640 as described elsewhere herein (e.g., control computing system 200, 340), as well as an accelerometer 650. Advantageously, this embodiment is able to profile a surface purely by measuring vehicle tilt by the accelerometer and the wheel encoders, and thus it is not necessary to include any distance sensors to profile a surface (though distance sensors can further improve accuracy as described below).

More specifically, the control computing system 640, using the accelerometer, calibrates the present vehicle angle to a zero point at a first position (Position 1). Preferably, the zero point matches that of the gravity vector, though this is not required. FIG. 6 illustrates the zero point angle by first angle 660. The robotic vehicle 610 is then driven a first distance 665 to a second position (Position 2) as shown by FIG. 6. As the shape of the surface has changed from Position 1 to Position 2 (e.g., elevation, orientation), the angle measured by the accelerometer 650 of the robotic vehicle 610 relative to the zero point has been offset by a second angle 670. The robotic vehicle 610 is then driven a second distance 675 to a third position (Position 3), where the angle measured by the accelerometer 650 of the robotic vehicle 610 relative to the zero point has been offset by a third angle 680. The angle tilt data captured at each of Positions 1, 2, and 3 measured by the accelerometer 650 is passed to the control computing system 640 and processed by a processor executing one or more software modules (e.g., profile analysis module). For example, using this information, the system 600 can be configured to compute that the robotic vehicle 610 has moved along a line defined by the average of the tilt readings between two Positions to determine the delta of the offset (between Position 1 and 2 for example) by calculating the sine of the average angle (average angle at Position 1 and 2) times the distance travelled as estimated from the encoders on the wheels as the vehicle moved from Position 1 to 2. These delta offsets are then summed to estimate an absolute offset relative to the starting position of the vehicle. The foregoing comprises an algorithm which assumes that the robotic vehicle 610 has moved along a line defined by the average of the tilt readings between two positions, other algorithms can be employed to account for more complex movements, and the foregoing is merely by way of example.

To improve measurement accuracy, the system 600 preferably implements a short robotic vehicle 610 in order to take a localized measurement of tilt at any given Position in order to accurately determine how far the vehicle has moved in both the x and y directions. Similarly, it is advantageous for the system 600 keep the changes in distance small (e.g., distances 665, 675 may be 0.1 mm or 0.1 cm apart) when performing new measurements. Keeping the changes in distance small limits the chances of the system 600 missing information, such as if the surface is similar in two Positions, but changes between those Positions, and also provides more information to the processor 210 in order to create a finer detailed surface profile. In another way to improve accuracy, the system 600 can be configured by code in order to generate a profile as the robotic vehicle 610 moves in a forward direction of travel and then retraces that route along in a reverse direction of travel to generate two profiles. Then, the information generated in each profile is fused to improve the accuracy of the overall generated profile. If the two generated profiles differed by a specific amount, the vehicle could rerun the measurement and add the generated information into the data fusion to continue to improve accuracy.

While system 600 is contemplated without a distance sensor as a main focus, in one or more embodiments, a distance sensor can be added to the system to improve accuracy. For example, a distance sensor could be mounted on the robotic vehicle 610 to face the ground (e.g., passively mounted to point parallel to the pull of gravity) to measure the height of the vehicle above the surface. This information is then used to determine along what angle the vehicle was moving by comparing the wheel encoder readings to this distance measurement relative to the ground.

Figure 7:
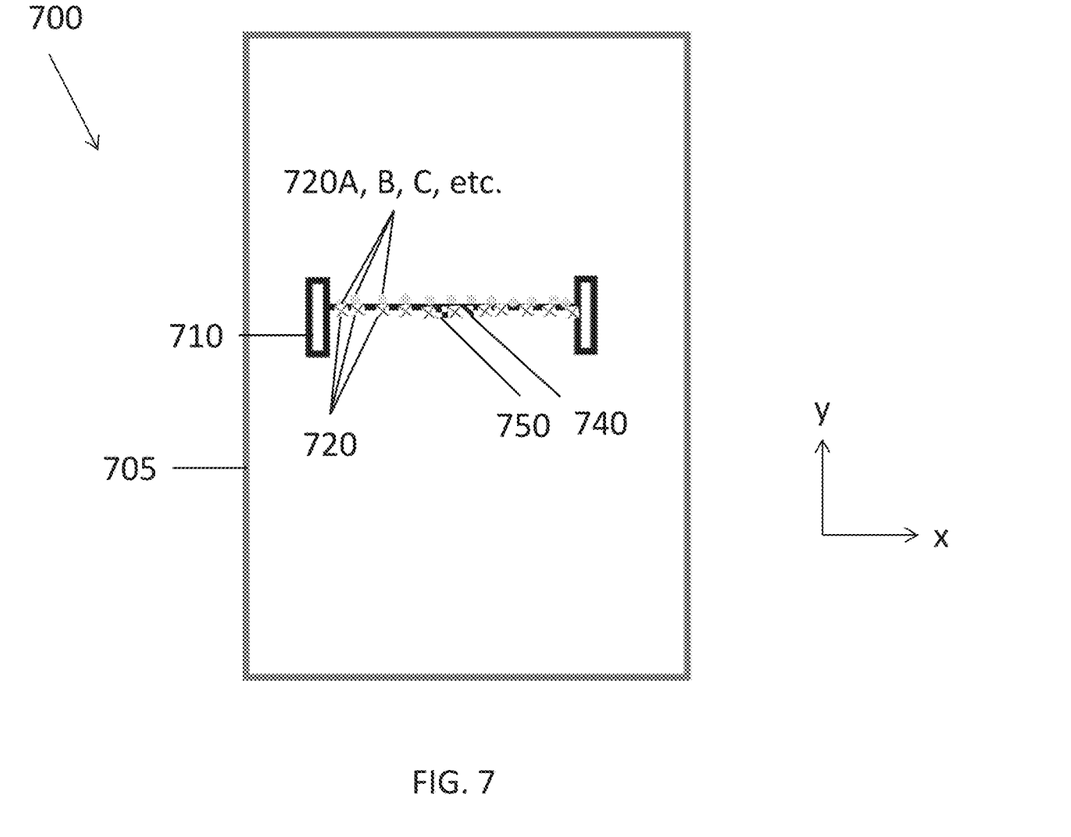
FIG. 7 presents a front view of an exemplary robotic vehicle, schematically illustrated, for profiling a system according to another embodiment.

Turning now to FIG. 7, a system 700 for profiling a surface 705 according to one or more embodiments is provided. FIG. 7 illustrates a front facing view of a robotic vehicle 710 having a plurality of distance sensors 720 spaced linearly along the shorter, horizontal axis of the vehicle (e.g., the x-axis in FIG. 7). For example, the plurality of distance sensors 720 can be substantially equidistant from one another across the horizontal axis. The horizontal axis can be coaxial with a central frame or axel of the robotic vehicle 710. By placing the distance sensors across the narrow axis of the robotic vehicle instead of the long axis, the sensors can gather distance information in both x and y directions. System 700 further includes wheel encoders, a control computing system 740 and an accelerometer 750 as described elsewhere herein and which provide information to the processors for calculating tilt and distance information in connection with the creation of surface profiles. By gathering data in two directions, the control computing system 740 can generate two surface profiles, one for each direction, thereby generating a 2-D profile of the surface.

In one or more embodiments, accuracy can be further improved by including a first set of distance sensors 720 arranged linearly along the longitudinal axis of the robotic vehicle 710 and a second set of distance sensors 720 arranged linearly along the horizontal axis of the robotic vehicle and perpendicular to the first set of distance sensors. In this way, each of the plurality of distance sensors 720 generates a separate data stream. Each distance sensor 720 can be calibrated to measure distances at different rates or different precisions. For example, one sensor can be configured to gather a distance measurement every 0.001 second, whereas another can be configured to gather a distance measurement every 0.01 second or 0.1 second. Similarly, each distance sensors can be separately configured to measure distance to the nearest centimeter, millimeter, or the like. The number of distance sensors 720 can be increased to provide finer "snapshot" measurements. In one or more embodiments, the distance sensors 720 are arranged equidistant from one another. In one or more embodiments, the distance sensors 720 are arranged on an outer surface of the robotic vehicle 710. In one or more embodiments, the distance sensors 720 are arranged within the robotic vehicle 710.

In one or more embodiments, surface profiling implements a simultaneously localization and mapping algorithm (SLAM) to map out the entire surface of an object (e.g., a tank wall) autonomously and with a certain tolerance for accuracy. SLAM algorithms are real-time localization systems that take environmental sensor data received at a vehicle in real-time and compare that data with previously known data in order to approximate the geometry of the present environment while keeping track of the vehicle within the environment. In accordance with the embodiments disclosed herein, a robotic vehicle is deployed having access to SLAM techniques in order to autonomously produce a 2-D ("unwrapped") or 3-D profile of a surface at a high accuracy. Depending on sensor and system sensitivity, SLAM techniques can provide greater accuracy than LIDAR techniques. In this way, the systems and methods described herein are not constrained to linear profiles or the 2-D profiles associated with FIG. 7.

Additionally, in one or more embodiments, the systems and methods herein include a laser reference device external to the robotic vehicle for estimating vehicle position. The laser reference device is preferably positioned at a known distance from a known location of a surface (e.g., the center of the surface). In operation, the laser reference device emits a vertical reference laser line (the beam has a linear width in the horizontal direction), rather oriented parallel to the surface. As the robotic device moves along the surface, light from the laser reference device is continually detected by a sensor coupled to the robotic device, such as an optical sensor. Any protuberances, recesses and unevenness on the surface will offset the position at which the sensor captures and detects the laser radiation emitted by the laser reference device. The measured offset can be used to calculate the magnitude of the deformations of the surface from reference calculations made at the surface. Since the calculation depends on an accurate reading of the position at which the optical sensor detects the laser, this method is reliant, to an appreciable extent, on the design of the optical sensor.

FIGS. 1 through 7 are conceptual illustrations allowing for an explanation of the present invention. Those of skill in the art should understand that various aspects of the implementations of the present invention could be implemented in hardware, firmware, software, or combinations thereof. In such implementations, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine-readable medium as part of a computer program product, and is loaded into a computer system or other device or machine via a removable storage drive, hard drive, or communications interface. Computer programs (also called computer control logic or computer readable program code) are stored in a main and/or secondary memory, and implemented by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single implementation, as other implementations are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific implementations will so fully reveal the general nature of the invention that others can, by applying knowledge within the skill of the relevant art(s) (including the contents of the documents cited and incorporated by reference herein), readily modify and/or adapt for various applications such specific implementations, without undue experimentation, without departing from the general concept of the present invention. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various implementations of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary implementations, but should be defined only in accordance with the following claims and their equivalents.

What is claimed is:

1. A robotic vehicle for autonomously calibrating a storage tank without remote input or processing, comprising:
    a body having a length;
    a drive system in the body and configured to move the robotic vehicle about a surface of the storage tank in the lengthwise direction;
    at least two wheels coupled to the body and including magnets, the at least two wheels being configured to contact and magnetically adhere to the surface of the storage tank using the magnets, and turn the robotic vehicle during the movement of the robotic vehicle;
    two or more wheel encoders housed within the at least two wheels for measuring the movement and generating movement data of the robotic vehicle when driven by the drive system about the surface of the storage tank;
    three or more distance sensors coupled to the body in a linear lengthwise arrangement to measure respective distances from the three or more distance sensors to the surface of the storage tank;
    an accelerometer coupled to the body and configured to generate data to capture an orientation of the body relative to the gravity vector; and
    a control computing system coupled to the body and comprising
        a non-transitory computer readable storage medium,
        one or more processors in electronic communication with the accelerometer, the three or more distance sensors, the two or more wheel encoders, the drive system, and the computer readable storage medium, and
        software modules comprising executable instructions stored in the storage medium, wherein the software modules are executable by the one or more processors and include
            a movement module that configures the one or more processors to receive the generated movement data from the two or more wheel encoders and the generated accelerometer data in order to determine the position and orientation of the robotic vehicle with respect to the surface of the storage tank and the gravity vector,
            a sensor control module that configures the one or more processors to instruct the three or more distance sensors to transmit a corresponding three or more signals toward the surface of the storage tank at respective impulse times and to detect respective travel times for the corresponding three or more signals to reflect off the surface of the storage tank, and
            a profile analysis module that configures the one or more processors to process the received movement data and orientation from the movement module, and to determine a snapshot of the surface of the storage tank by calculating the respective distances from the three of more distance sensors to the surface of the storage tank using the detected respective travel times for the corresponding three or more signals to reflect, the determined orientation, and the processed movement data, and to store the determined snapshot in the non-transitory computer readable storage medium,
        wherein the drive system is further configured to autonomously drive the robotic vehicle to traverse the surface of the storage tank while the control computing system continuously determines a plurality of snapshots of the surface of the storage tank as the position of the robotic vehicle with respect to the surface of the storage tank changes to autonomously generate a profile of the surface of the storage tank without remote input or processing and to autonomously calibrate the storage tank using the generated surface profile.

2. The robotic vehicle according to claim 1, wherein a first sensor of the three or more distance sensors is mounted on a front portion of the robotic vehicle, and a second sensor of the three or more distance sensors is mounted on a rear portion of the robotic vehicle.

3. The robotic vehicle according to claim 1, wherein the three or more distance sensors are arranged linearly along a longitudinal axis of the robotic vehicle.

4. The robotic vehicle according to claim 1, wherein the three or more distance sensors are arranged linearly along a longitudinal axis of the robotic vehicle, with adjacent such distance sensors being substantially equidistant from one another.

5. The robotic vehicle of claim 1, wherein the three or more distance sensors are arranged on an outer surface of the robotic vehicle.

6. The robotic vehicle of claim 1, wherein the three or more distance sensors are arranged within the robotic vehicle.

7. The robotic vehicle according to claim 1, wherein the processed movement data includes a speed of the robotic vehicle or a distance traveled of the robotic vehicle.

8. The robotic vehicle according to claim 1, wherein the profile analysis module further configures the one or more processors to calculate respective times of flight (TOFs) for the corresponding three or more signals traveling between the three or more distance sensors and the surface of the storage tank, to determine the respective distances from the three or more distance sensors to the surface of the storage tank at given points based on the respective TOFs, and to store the respective distances from the three or more distance sensors to the surface of the storage tank at the given points in the non-transitory computer readable storage medium.

9. The robotic vehicle according to claim 1, wherein the control computing system generates the profile of the surface of the storage tank by solving equations based on the detected respective travel times and the processed movement data to determine how the surface of the storage tank looks.

10. The robotic vehicle according to claim 1, wherein the three or more distance sensors comprise 12 or more distance sensors.

11. A robotic vehicle for autonomously calibrating a storage tank without remote input or processing, comprising:
  a body having a length and a width;
  a drive system in the body and configured to move the robotic vehicle about a surface of the storage tank in the lengthwise direction;
  at least two wheels coupled to the body and including magnets, the at least two wheels being configured to contact and magnetically adhere to the surface of the storage tank using the magnets, and turn the robotic vehicle during the movement of the robotic vehicle;
  two or more wheel encoders housed within the at least two wheels for measuring the movement and generating movement data of the robotic vehicle when driven by the drive system about the surface of the storage tank;
  three or more distance sensors coupled to the body in a linear widthwise arrangement to measure respective distances from the three or more distance sensors to the surface of the storage tank;
  an inertial measurement unit coupled to the body for measuring an angle of the robotic vehicle relative to the direction of gravity; and
  a control computing system coupled to the body and comprising
    a non-transitory computer readable storage medium,
    one or more processors in electronic communication with the inertial measurement unit, the three or more distance sensors, the two or more wheel encoders, the drive system, and the computer readable storage medium, and
    software modules comprising executable instructions stored in the storage medium, wherein the software modules are executable by the one or more processors and include
      a movement module that configures the one or more processors to receive the generated movement data from the two or more wheel encoders and the measured angle of the robotic vehicle in order to determine the position of the robotic vehicle with respect to the surface of the storage tank and the direction of gravity,
      a sensor control module that configures the one or more processors to instruct the inertial measurement unit to determine a first angle at a first position on the surface of the storage tank relative to gravity, and to determine a second angle at a second position on the surface of the storage tank relative to gravity, and to instruct the three or more distance sensors to transmit a corresponding three or more signals toward the surface of the storage tank at respective impulse times and to detect respective travel times for the corresponding three or more signals to reflect off the surface of the storage tank, and
      a profile analysis module that configures the one or more processors to determine an offset relative to the direction of gravity between the first position and the second position, to process the received movement data from the movement module, to determine a snapshot of the surface of the storage tank between the first position and the second position using the determined offset, the detected respective travel times for the corresponding three or more signals to reflect, and the processed movement data, and to store the determined snapshot in the non-transitory computer readable storage medium,
    wherein the drive system is further configured to autonomously drive the robotic vehicle to traverse the surface of the storage tank while the control computing system continuously determines a plurality of snapshots of the surface of the storage tank as the position of the robotic vehicle with respect to the surface of the storage tank changes to autonomously generate a profile of the surface of the storage tank without remote input or processing and to autonomously calibrate the storage tank using the generated surface profile.

12. The robotic vehicle of claim 11, wherein the profile analysis module determines the offset by calculating a sine of an average of the first angle and the second angle multiplied by a distance measured by the two or more wheel encoders between the first position and the second position.

13. The robotic vehicle of claim 11, wherein the three or more distance sensors are arranged linearly along a horizontal axis of the robotic vehicle.

14. The robotic vehicle of claim 11, wherein the three or more distance sensors are arranged linearly along a horizontal axis of the robotic vehicle, with adjacent such distance sensors being substantially equidistant from one another.

15. The robotic vehicle of claim 11, wherein the processed movement data includes a speed of the robotic vehicle or a distance traveled of the robotic vehicle.

16. The robotic vehicle of claim 11, wherein the profile analysis module further configures the one or more processors to calculate respective times of flight (TOFs) for the corresponding three or more signals traveling between the three or more distance sensors and the surface of the storage tank, to determine the respective distances from the three or more distance sensors to the surface of the storage tank at given points based on the respective TOFs, and to store the respective distances from the three or more distance sensors to the surface of the storage tank at the given points in the non-transitory computer readable storage medium.

17. The robotic vehicle of claim 11, wherein the control computing system generates the profile of the surface of the storage tank by solving equations based on the detected respective travel times and the processed movement data to determine how the surface of the storage tank looks.

18. The robotic vehicle of claim 11, wherein the three or more distance sensors comprise 12 or more distance sensors.

* * * * *